United States Patent [19]
Rahim

[11] Patent Number: 5,155,683
[45] Date of Patent: Oct. 13, 1992

[54] VEHICLE REMOTE GUIDANCE WITH PATH CONTROL

[76] Inventor: Wadiatur Rahim, 201 Newberry Rd., Severna Park, Md. 21146

[21] Appl. No.: 683,706

[22] Filed: Apr. 11, 1991

[51] Int. Cl.$^5$ ............................................. G06F 15/50
[52] U.S. Cl. ............................. 364/424.02; 358/103; 180/168
[58] Field of Search ............... 364/443, 444, 424.02, 364/448; 358/103; 180/167, 168, 169; 318/587

[56] References Cited

U.S. PATENT DOCUMENTS

| | | | |
|---|---|---|---|
| 4,405,943 | 9/1983 | Kanaly | 358/103 |
| 4,855,822 | 8/1989 | Narendra et al. | 364/424.02 |
| 4,926,346 | 5/1990 | Yokoyama | 364/424.02 |

*Primary Examiner*—Gary Chin
*Attorney, Agent, or Firm*—Richard C. Litman

[57] ABSTRACT

In a remotely piloted surface vehicle a television camera is used to send images to a screen on the operator's station. A computer displays the vehicle's intended path on the screen. The path appears as a computer-generated line superimposed on the image of the vehicle's environment, like a stripe painted on the ground. The operator can change or advance the path on the screen with a cursor control. A computer picks certain discrete screen points along the line and maps those screen positions onto ground positions called "waypoints". These are sent to the vehicle's guidance system to direct the vehicle along a path through the waypoints. The transform which maps the screen path onto the ground path depends on the camera orientation and lens. The transform parameters can be adjusted as the camera zooms, pans and tilts. Each time the screen is refreshed, the path line for that screen is calculated by the computer from the ground path, to present the ground path correctly in the new screen. The operator can extend or modify the path at will. The system is especially adapted to use in cases where a narrow bandwidth of the radio link between the camera and the station limits the screen refresh rate. The system maximizes the possible speed of the vehicle by presenting the path information in a format quickly grasped by the operator.

10 Claims, 4 Drawing Sheets

VEHICLE REMOTE GUIDANCE WITH PATH CONTROL

FIELD OF THE INVENTION

The present invention relates to remote control systems for unmanned surface vehicles which are guided by an operator, in systems where the operator can see the vehicle environment by a television link.

DESCRIPTION OF THE PRIOR ART

Remote vehicle guidance has many areas of possible application. An operator riding within the vehicle may be impractical if the vehicle is small or underpowered. A vehicle operator may also be endangered in poisonous environments or in military vehicles during a battle.

A system for remote control must transmit commands from the operator's station to the vehicle, and the operator also needs feedback from the vehicle. The typical way to feed back information to the operator is through a video link from a television camera on the vehicle. Television cameras are now small and rugged enough for almost any application. It might be expected that an operator sitting at a remote station could control a remote vehicle as well by watching the environment through a high-resolution TV screen as by sitting in the vehicle and looking through a window. Unfortunately, however, the usefulness of remotely controlled vehicles is often limited by poor image feedback to the operator. This is because radio links are the only practical way to send back the images from the TV camera on the vehicle to the operator's station, in most cases.

Television, or any other system which transmits images, requires a large radio bandwidth because information is transmitted at a high rate. Images which are sent in real time, and which have reasonable resolution, may require a megahertz or more of bandwidth. Clearly, finding a place in the radio spectrum for the video link can be hard. In the case of military vehicles, there could be hundreds or even thousands of vehicles all operating at once during a battle, each needing its own uncluttered band.

Single-sideband radio, data compression techniques, and computer image enhancement can help somewhat. Special techniques like fiber-optic tethers and laser or microwave links could entirely solve the bandwidth problem, but they are impractical for other reasons. Tethers are obviously limited by length, fragility, and fouling. Infrared, visible and microwave links can only be used as line-of-sight beams, which must be accurately aimed at the moving vehicle and which are cut off by intervening objects, including the horizon. For radio links of ordinary frequencies and ranges, the fundamental constraints imposed by the mathematics of Fourier's Theorem and information theory often will mean that the images coming to the operator are either very grainy, or alternatively, that they can only be refreshed at intervals greater than the persistence time of the eye (about a twentieth of a second) and so will flicker or appear as a series of still images. Image resolution and refresh rate can be traded off against one another, but the graininess of the image cannot be arbitrarily increased; so with limited bandwidth, the refresh rate will be slowed.

(Even if the refresh rate is of the order of a minute, useful information will be presented at intervals; but if the grain is too coarse, objects will not be seen and the operator will end up colliding the vehicle with some obstacle.)

Once the screen refresh rate drops to the point where a second or more is elapsing between frames, driving the remote vehicle becomes very difficult. The operator will tend to react to a screen as if it is in real time, that is, as if the vehicle were at the ground position from which the screen image is taken; but the vehicle is elsewhere by the time the operator views the image. A delay is introduced into the feedback loop which sends the operator's commands to the vehicle and the camera's information to the operator. If the operator is under stress or must quickly make many decisions, as in a battle, he or she is likely to control the vehicle badly—even if trained to take the delay into account. As the delay becomes longer, the problem is aggravated.

The prior art has dealt with this problem in various ways. One approach is to limit high resolution to only a portion of the viewing screen; this portion is picked by the operator to view an area of interest. The area of interest appears in focus, surrounded by blurred area. This approach is discussed by Kanaly in U.S. Pat. No. 4,405,943. The loss of information with this system is obvious. Complication and operator confusion are introduced by the requirement of picking an area, and the extra hardware and/or software required.

Graham, in U.S. Pat. No. 4,682,225, discloses another system. Graham discusses image compression, which involves sampling the data stream from the camera at intervals and transmitting only the sampled data. The resulting screen image is blurred. If the camera is almost stationary, image clarity can be improved by superimposing the blurred images of the sampled data. (The human eye will itself do this over intervals less than a second.) Basically, this system trades off clarity or detail in favor of an appearance of continuous "real time" motion on the screen. The same bandwidth which could transmit high resolution screens at intervals instead transmits a multitude of blurred screens. If the camera is panned, zoomed, or jiggled, the technique is totally ineffective. Also, if the superposition is by hardware or software rather than in the eye, cost and complexity are involved.

Hinman, in U.S. Pat. No. 4,661,849, discusses interpolation between discrete screen images or frames by computer simulation. This presents an appearance of smooth motion to the viewer. Such a system is costly in computer hardware and software running time, and may mislead the operator by presenting an impression of real time events which are fictitious projections instead of the real environment.

Narendra et al. (U.S. Pat. No. 4,855,822) also employs a computer to generate interpolated image between the discrete images sent by the camera, so as to present an impression of continuous motion of the operator. Their interpolations are determined by the motion of the vehicle. Narendra et al. also disclose the idea of superimposing an image of the vehicle on the screen. Conventional bandwidth compression techniques are used by Narendra et al.

The Jet Propulsion Laboratory has developed a system called Computer Aided Remote Driving (CARD). The CARD system is described in a paper, "Computer-Aided Remote Driving", presented at the 13th annual meeting of the Association for Unmanned Vehicle Systems in Boston, MA on Jul. 21-23, 1986. The paper is authored by Brian H. Wilcox, Robert Salo, Brian Cooper, and Richard Killon, Technical Group Supervisor at the Jet Propulsion Laboratory of California Institute of Technology in Pasadena, CA.

CARD is intended for interplanetary remote control of vehicles and military applications. In remotely driving a vehicle on another planet, narrow bandwidths data restrictions are compounded by message delays due to the finite speed of radio beams. Vehicle speed is not crucial on another planet, but may be in a military application.

The CARD system uses two high-resolution cameras to generate a stereo image for the operator. The operator views both images at once, one through either eye, to see the vehicle environment in three dimensions. The viewing system has two screens with relatively crossed Polaroid filters, two half-silvered mirrors to superimpose the images, and Polaroid glasses worn by the operator to isolate the two images. Three-dimensional viewing may be helpful when the operator is viewing an extraterrestrial environment, and is less able to extrapolate distances from unfamiliar objects.

The CARD operator at the control station sends a signal to the vehicle to transmit the stereo images, and waits for all the data for both screens to arrive at the station and to appear in the stereo viewer. Then the operator uses a three-dimensional control to denote points in the space seen in the viewer. (A three-dimensional control is one with three degrees of freedom; CARD uses a joystick with a rotatable knob.) The control drives a cursor which is superimposed on the picture which the operator sees, and which appears to move about in space in response to the operator's motion of the three-dimensional control.

A computer at the station takes the three dimensions of joystick motion and turns them into Cartesian space coordinates x, y, z at the vehicle location; it then transforms those coordinates into individual screen positions for the two viewing screens, so that the operator sees the cursor located in space in the stereo image. The transform from space coordinates to screen coordinates can easily be programmed from the geometry.

The operator, by depressing a button, can denote any cursor position as a waypoint. He or she denotes a series of waypoints to define points of a path in the space seen in the viewer, over which the operator wants the vehicle to travel. When all the waypoints are denoted, the operator pushes the "go" button. The station computer then takes the control readings recorded from the waypoints, transforms them into the appropriate commands (vehicle angles, segment lengths, compass headings), and relays these commands to the vehicle. The received commands tell the vehicle's guidance system how to proceed. The vehicle automatically responds to the commands by moving to the next waypoint; eventually it reaches the final point. It then begins the process over by sending two more images.

Neither the station computer nor the on-board computer calculates any curve from the waypoints: the vehicle moves straight to the next point, turns abruptly, and then goes on to the next. The station computer interrogates the vehicle's on-board computer about the vehicle's heading after each leg of the path is traversed, and instructs the vehicle for the next leg of the path.

CARD avoids the feedback problem by eliminating any semblance of real-time driving, and instead presenting the operator with a static problem: given a picture, chart a path through it. Operator confusion is eliminated, but at the cost of dead-time in the control cycle. The operator must wait while the vehicle laboriously goes through all of the waypoints, takes a picture, and transmits the image over the slow radio.

Being sluggish, CARD is not adapted to any use in which the operator should react quickly to changes in the vehicle environment, such as military use. CARD also has the drawback that it effectively halves the bandwidth of the radio link by presenting two stereo images, instead of only one. Moreover, the resolution needed for each of the combined stereo images is substantially greater than the resolution needed for a single monoscopic image of equal clarity. This is because higher resolution is needed to locate objects in the depth dimension when the images are combined. This need further decreases the effective bandwidth.

CARD uses conventional data compression techniques to decrease the bandwidth by about a factor of four. Such techniques are too slow for real time video, but are effective with slower transmission.

The CARD prototype described in the paper uses solid-state cameras 0.5 m apart. The cameras have a grain of 320 pixels per horizontal line, giving a 1-pixel stereo offset for objects at a range of 300 m. The vehicle includes a magnetic compass and odometer for dead reckoning calculation of vehicle position by the small on-board computer.

None of the above inventions and patents, taken either singly or in combination, is seen to describe the instant invention as claimed.

The prior art does not disclose any system for driving a vehicle by remote imaging under low screen refresh rates which is adapted to real-time driving; which is easy and natural for an operator to use; which is simple and reliable; which is inexpensive; and which allows the operator to react in the least possible time.

Accordingly, one object of the present invention is a vehicle remote imaging control system which does not confuse the operator with time delays in the control loop.

Another object is a system which is as simple as possible given the constraints of slow image data transfer, so as to be reliable and inexpensive.

A further object is a system with minimal computer hardware and software requirements.

An additional object is a system which allows a vehicle to proceed at the utmost speed.

A final object is a system which uses only available, proven technology.

These and other objects of the present invention will become readily apparent upon further review of the following specification and drawings.

SUMMARY OF THE INVENTION

In a remotely piloted surface vehicle, where a television camera on the vehicle is used to send images to a screen at a vehicle operator's station, the present invention comprises an improved and simplified system for remote driving. The system is especially adapted to slow video data transfer rate situations, where real-time video is unavailable and the operator can see only discrete "snapshot" image frames on the screen.

The vehicle's intended path is displayed on the operator's viewing screen. The path appears as a computer-generated line superimposed on the image of the vehicle's environment, appearing like a stripe painted on the ground. A screen cursor appears at the end of the line. The operator can change or advance the path line on the screen with a cursor control device, which might be a joystick, mouse, steering wheel and pedals, or any other control having two degrees of freedom.

As the line is extended by the operator, the computer picks certain discrete screen points along the line extension. The computer then maps these points onto ground positions in the vehicle environment by a mathematical transform. The ground positions are called "waypoints". These are sent to the vehicle's guidance system to direct the vehicle along a path through the waypoints. The guidance system has a memory which stores the waypoints and directs the vehicle successively over them.

The transform which maps the screen path onto the ground path uses simple trigonometric formulas and perhaps coordinate transformations. The transform and parameters depend on the camera orientation and lens. The transform parameters can be continuously adjusted if the camera zooms, pans or tilts.

In the usual low video data rate situation, the operator will see a sequence of still frames or "snapshots". A few frame will replace the old automatically at intervals determined by the data rate and the screen resolution.

The vehicle's computer includes an image buffer to store data from a instantaneous view of the camera. This data is sent to the station. Once all the data are arrived, that frame is automatically displayed on the operator's screen. The operator sees a frame taken some time ago.

For each new screen the path line is recalculated from the reported position of the vehicle relative to the ground points. The recalculated path line is then superimposed on the screen so as again to appear to lie on the surface, and the operator can quickly perceive the new situation of the vehicle and correct the projected path.

BRIEF DESCRIPTION OF THE DRAWINGS

Similar reference characters denote corresponding features consistently throughout the attached drawings.

DETAILED DESCRIPTION OF THE PREFERRED EMBODIMENTS

Some definitions of terms, used in the following Description and Claims, are:

"Camera" means film camera, infrared TV, radar, imaging sonar, or any other imaging apparatus whatsoever, as well as the typical visible light scanning television camera.

"Computer" means a digital computer, analog computer, hard-wired logic circuits, or any calculating device with memory.

"Cursor" means any visible, movable highlight, emblem, outline shape, etc. which can denote a position or area on a screen, and which can move in at least two dimensions. The cursor may include means for denoting direction as well as position, particularly by its shape. Typically, the cursor will be a flashing highlight on a CRT screen. The cursor may be shaped as a point, an arrow, an outline of the vehicle as seen in perspective at the cursor location, or any other shape.

"Downlink" refers to radio transmission of information from the vehicle to the station.

"Frame" means a single static view or image which fills the screen.

"Ground" means a surface over which the vehicle moves, be it concrete, carpeting, water, or any other surface. The invention is not limited to land vehicles traveling over earth.

"Radio" means communication by waves, such as electromagnetic waves. Sonar is one possible such wave.

"Screen" means any viewing device which appears to be flat or two-dimensional to the operator or viewer (as opposed to stereoscopic). Ordinarily the screen of the present invention will physically be a surface, such as the glass surface of a CRT. A liquid crystal screen, or any other surface capable of displaying a path and some image corresponding to the vehicle environment, may be used. Emblems or icons whose positions correspond to those of objects or conditions near the vehicle may be used instead of, or in addition to, regular transmitted pictures. The definition does not exclude monocular viewers such as helmet-mounted devices, or viewing goggles with individual lens systems presenting the same image, which do not incorporate a physical surface for viewing. Enhanced images are also within the scope of the invention.

"Uplink" refers to radio transmission of information from the station to the vehicle.

"Vehicle" means any device adapted to travel on or above a ground surface, having means to power the device to move and having means for controlling the motions.

"Waypoint" means a ground position referable to the coordinates of the vehicle guidance system or steering geometry. A waypoint may also be a position combined with a heading and/or a speed. It may also be any time derivative of position, such as acceleration. In general, it is a datum or data set to which vehicle position is referable. A waypoint may include elevation as well as ground position.

Figure 1:
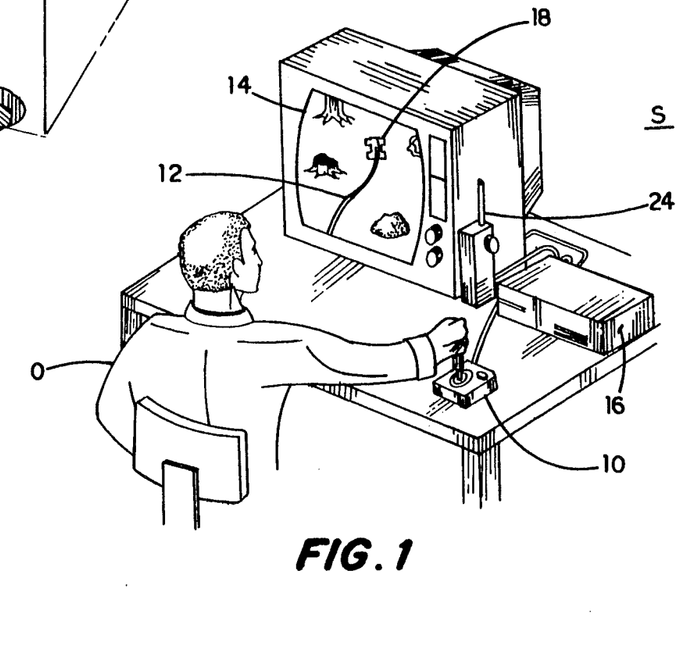
FIG. 1 is a perspective view of an operator controlling the radio message from a computer.
Figure 2:
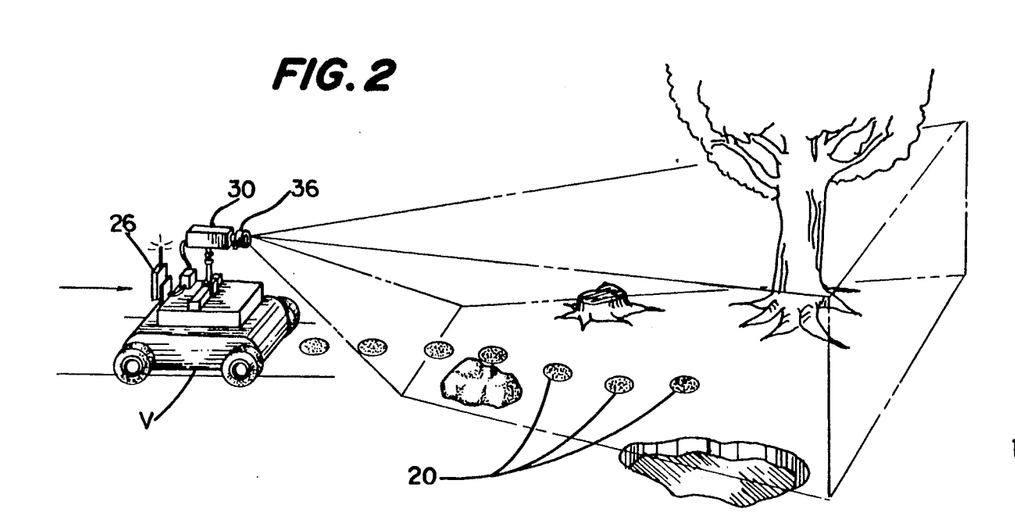
FIG. 2 a perspective view of the controlled vehicle, showing obstacles, a trapezoidal area seen by the camera on the vehicle, and waypoints on the ground.

The present invention, as seen in FIGS. 1 and 2, is a system for presenting future vehicle path information to the operator O (FIG. 1) of a remotely controlled vehicle V (FIG. 2), where the vehicle V sends images back to the operator's station S from a camera 30 mounted on the vehicle V. It employs a station computer 16 to superimpose on a station screen 14 a screen path line 12 showing the intended future path of the vehicle V over the surface. The operator O takes the line 12 to lie on the ground surface, like a painted stripe on a highway; the system is designed for this operator perception, and includes software to generate a projected ground path as a line on screen.

Radios 24 at on the vehicle V and at the station S send data back and forth.

The operator O, seen at the control station in FIG. 1, uses a cursor control joystick 10 to extend or modify the screen path line 12 as seen on the screen 14. The operator O traces out an apparent path for the vehicle V with the aid of a cursor 18 which is superimposed on the viewing image at the end of the line 12. The operator O can move the cursor 18 about at will with the joystick 10.

The line 12 must be transformed into a planned ground surface path by a simple computer program, which maps the position of any point on the screen 14 into a corresponding ground point on the ground traversed by the vehicle V. The mapping transform will ordinarily map the rectangle of the screen onto the trapezoid on the ground which is seen by the camera 30, as shown in FIG. 2. The mapping program parameters will depend upon the altitude, attitude, and focal length of the camera lens 36.

Figure 3:
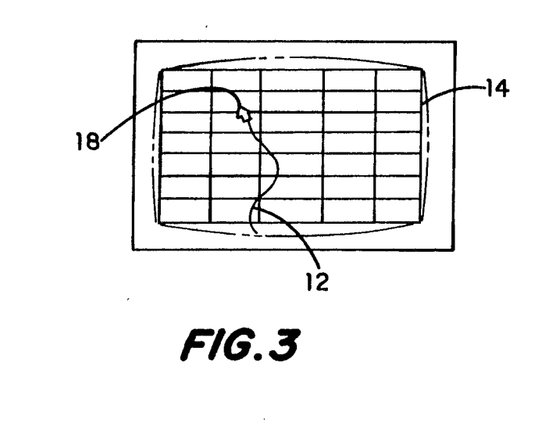
FIG. 3 is a schematic elevation view showing a screen path and rectangular coordinates on the screen.
Figures 4, 5:
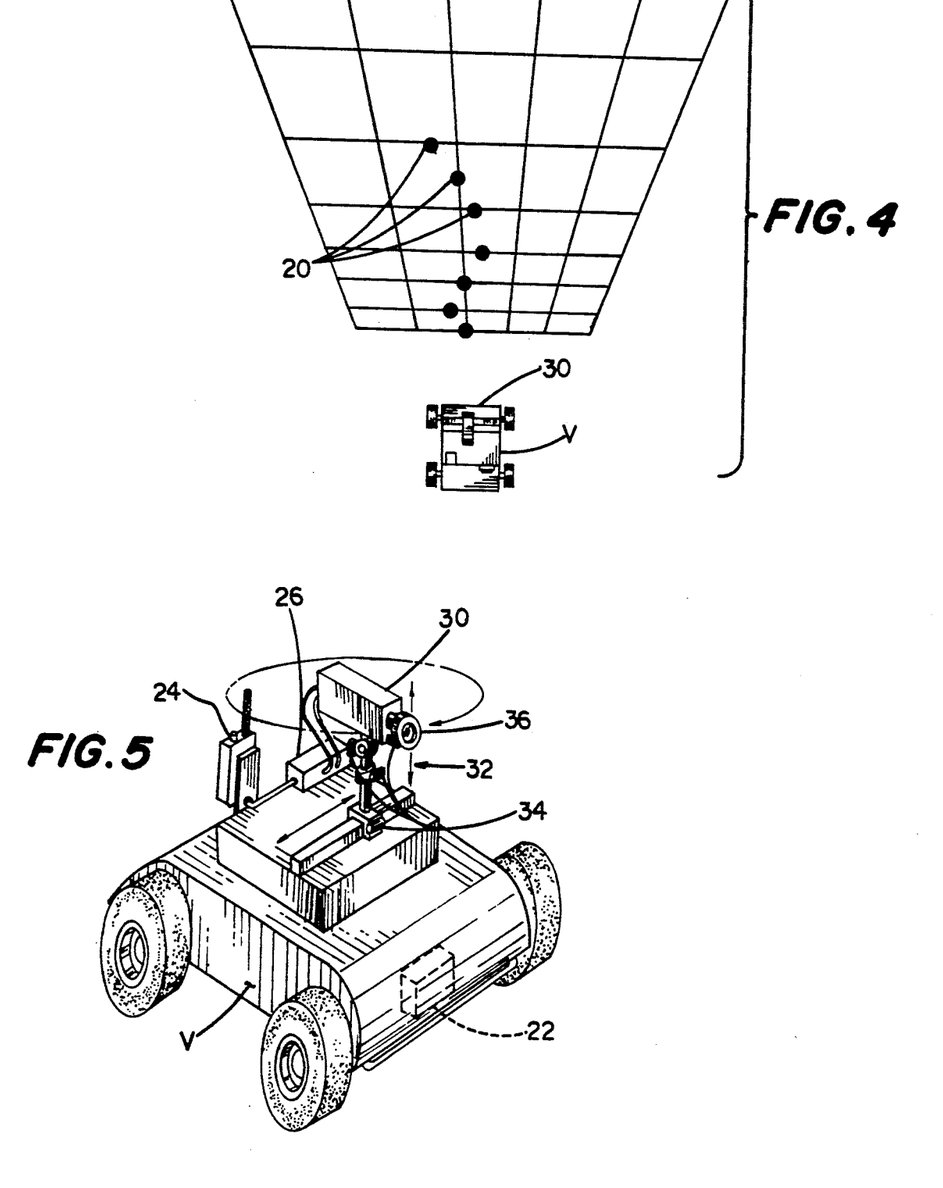
FIG. 4 is a schematic plan view showing the rectangular coordinates and screen path of FIG. 3 transformed into ground coordinates and waypoints on the ground.
FIG. 5 is a perspective view of the vehicle.

The transform idea is illustrated schematically in FIGS. 3 and 4. FIG. 3 shows the viewing screen of FIG. 1, but no camera image of the vehicle environment is shown: instead is shown a rectangular grid corresponding to a possible system of screen coordinates. (This grid is not a physical image seen by the operator O, but is rather a mathematical projection to explain the transform.) A screen path is also shown, in the form of a line 12. The screen path ends with a cursor 18 in the shape of an arrow. FIG. 4 is a bird's eye or plan view of the ground in front of the vehicle V, showing the rectangular grid of FIG. 3 transformed into a trapezoidal grid. The screen path of FIG. 3 has been transformed into discrete "waypoints", labeled 20, which outline the planned ground path of the vehicle; the generation of the waypoints 20 is explained below. Both the grid lines and waypoints of FIG. 4 are, like the grid of FIG. 3, non-physical.

Figure 6:
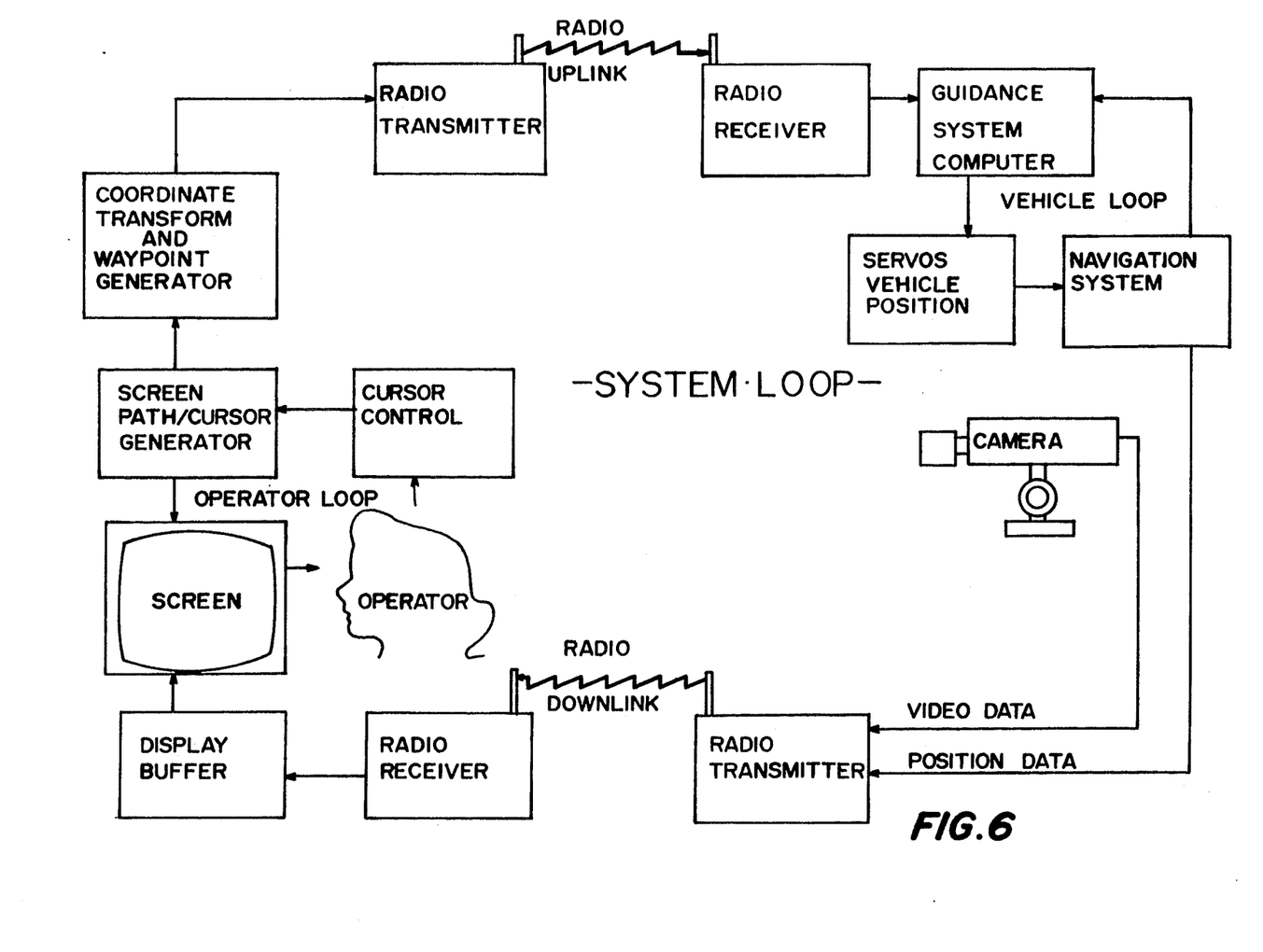
FIG. 6 is a schematic showing the flow of vehicle control information through the system.

The transform is performed by a computer or computers at the station. This function is illustrated by the box labeled coordinate transform and waypoint generator" in Schematic FIG. 6. FIG. 6 shows the flow of information in the present invention: arrows represent information, and boxes are devices and/or processes such as computer algorithms. The reader will find reference to FIG. 6 helpful in the following discussion.

It is possible for the operator's cursor control to directly generate planned ground coordinates. The computer would in this case transform those coordinates back to screen coordinates for screen 14 display. The essential thing is that the operator work in the view of the screen and that the screen path be correctly transformed into a planned ground path.

Usually the transform will require only trigonometry. If an unusual camera lens 36 is used, for example a fisheye lens, more complex coordinate transformations will be needed. In any case, the formulas of transformation are simple, straightforward, and easy for one skilled in the art to implement.

The control joystick 10 shown in FIG. 1 is well adapted to a simple point cursor 18. Other controls might be adapted to other sorts of cursors. For example, if an angle control such as a steering wheel is used, the cursor 18 might be in the shape of an arrow, whose angle corresponds to the angle of the steering wheel. The joystick 10 of FIG. 1 can include a rotatable knob for angle.

The cursor 18 may also be made large and shaped like the outline of the vehicle V. This form of cursor 18 is illustrated in FIG. 1. The operator O may then guide the cursor 18 outline through narrow gaps as shown in FIG. 1, and avoid a path if the outline will not fit through. In this case there could be two screen path lines 12 instead of the one illustrated in FIGS. 1 and 3, each one line trailing from a respective outer edge of the vehicle outline cursor 18. The outline should be displayed in perspective, so as to appear on the screen image of the ground as would a shadow of the vehicle V cast by a sun directly overhead. The size and shape of the outline can easily be calculated for the display. Such an outline is easily programmed by one skilled in the art. The outline of the vehicle V may also be simplified to a rectangle or bar indicating the width of the vehicle V.

Preferably, the cursor 18 sweeps out the line 12 on the screen, just as a marker leaves a line on paper, to denote the screen path. As an alternative, the cursor 18 might be used to set the screen positions of the individual ground waypoints 20 through which the vehicle V would pass, like dots on paper. The screen points could be clicked on with a button and appear on the screen as dots or cursor shapes. The computer 16 would then transform the coordinates of the screen path points into ground waypoint coordinates for radio uplink transmission to the vehicle's guidance system. However, operator choice of waypoints 20 puts an extra workload on the operator, so the waypoint choice is best left to the station computer, which can pick waypoints 20 without inordinate hardware and software requirements.

If the path line 12 is continuous, the station computer 16 will pick ground waypoints 20 based on some decision algorithm which keeps the waypoints 20 spaced closely enough to track the vehicle V. The infinity of points defining a continous line cannot be transmitted to the vehicle V, and is not needed. The guidance system of the vehicle can regenerate a planned ground path through the waypoints 20 and then follow that path. The required spacing of the transmitted waypoints 20 will depend upon the sophistication of the path regeneration program of the vehicle's guidance system.

The coordinate transform and waypoint generation computer may display the screen path swept out by the cursor 18 as a line 12, or, may generate multiple images on the screen, located at the waypoint or elsewhere. Any display which informs the operator O of the screen path of the vehicle is within the scope of the present invention.

Since it may be necessary to readjust the projected path of the vehicle in the face of emergencies or miscalculations, the cursor control should have the capability of erasing the end of the screen path, that is, "backtracking". It may be helpful to have a separate cursor reverse control which would erase the screen path line 12 from the end of the line back toward the vehicle.

The vehicle guidance system, which receives the waypoint coordinates from the station's transform and waypoint generation computer by way of the radio uplink, must include a guidance system computer 26 as seen in FIG. 1, or equivalent hard-wired circuitry, which has a memory. The memory stores the coordinates of the projected waypoints 20, which define a ground path for the vehicle V. This allows the operator O to set a planned ground path for the vehicle V to follow while the next frame is being transmitted. The guidance memory is an essential element of the present invention, as it allows driving in the future time of the instant of the snapshot frame, and avoids feedback loop trouble.

Because the waypoints 20 need to be erased when the path is changed, the guidance system computer memory may conveniently be of the last-in, first-out stack type.

The guidance system may of any type which allows the vehicle V to automatically steer through the waypoints 20. The vehicle may rely on dead reckoning to guide it on its path along the waypoints. Any method of tracking distance and direction, such odometers, integrating accelerometers, compasses, gyroscopes, or other conventional guidance means are feasible.

The guidance system need not receive operator commands directed toward the motion parameters of the vehicle V, such as vehicle speed and steering wheels angle. The transmitted waypoints 20 are sufficient to track the vehicle V and control its speed (although direct speed control may be advantageous in some cases, and is not outside the scope of the invention). The more sophisticated the guidance program, the less need there will be for commands additional to the waypoint coordinates.

The guidance computer accepts the waypoint coordinates from the radio uplink as input, and outputs signals directly to the vehicle servomechanisms which control the motor, brakes and steering of the vehicle V. (Motor, etc. are listed as examples. Any sort of physical controls, depending on the particular type of vehicle, may be part of the invention. In this Description and in the following Claims, "vehicle servomechanism" means any means for physically controlling a vehicle according to signals from the guidance system.)

The physical motions of the vehicle V in response to the guidance system signals will not ordinarily be completely predictable. Wheel slip, steering gear backlash, or water or air currents (in the cases of vehicles which are boats or planes), will all throw off the intended path. In other words, the planned ground path and the executed ground path may differ. For this reason, the vehicle will ordinarily include a navigation system consisting of sensors and means for reporting the vehicle's attitude, speed, etc. to the vehicle guidance system and to the operator's station computer.

The sensors may be odometers, magnetic compasses, accelerometers with position integrators, speedometers, gyrocompasses, satellite position sensors, or any other means of detecting the position, attitude, or state of the vehicle V.

(The guidance system may act upon the input of non-navigational sensors as well. Such sensors would detect vehicle environmental conditions or dangers, such as mines, quicksand, etc. Such a sensor 22 is shown in FIG. 5.)

The feedback of the navigation system to the guidance system is optional in cases where the vehicle motion is predictable from the signals sent to the vehicle servomechanisms. However, the feedback of the vehicle V position to the station computer is not optional, because the vehicle position at the time of the frame snapshot must be known to the station computer's screen path generator if the screen path is to be correctly displayed on the screen 14. Therefore a device to maintain and report the vehicle's current position at any time is an essential element of the present invention. The navigation system with its sensors may be omitted if dead reckoning calculations in the guidance system are relied upon to maintain a current vehicle position, and the guidance system has means for reporting the position at the time of a snapshot to the station.

The projected path of the vehicle V extends from the vehicle position where the most recent frame was taken by the camera; this is the reference point for all calculations and motions. The path will extend up to the last waypoint 20 transmitted by the operator O. The guidance system need not stop or slow the vehicle V until it nears the last waypoint 20 in the path.

The vehicle, when it transmits a frame, will also transmit a report on its position at the time of the "snapshot". This frame position will be referenced to the waypoints. The current vehicle position, as discussed above, is maintained by the navigation system or guidance system.

Each time the screen is refreshed with a new frame, a new screen path line 12 for that frame is calculated by the computer of the screen path generator. Input for the calculation is the vehicle's reported frame position and the stored waypoint positions; output is the placement of the line 12 on the screen. The line 12 is constructed from the waypoints by an algorithm which operates inversely to the algorithm which picks the waypoints from the line.

The position of the vehicle V at the time the frame is taken will generally be intermediate between waypoints. The intermediate position may be referenced in various ways: the coordinate origin may be shifted to the last-passed waypoint; the position may be specified as a path distance from the last waypoint, and the path reconstructed by a station computer according to the same algorithm which the guidance system computer uses to generate the ground path from the waypoints; or some other methods may be used.

It should be noted that the screen path is referenced to both the ground position of the vehicle at some instant and the frame snapshot taken at the same instant. Even if the executed ground path has drifted away from the planned ground path, and the navigation system has not corrected the error, the screen path, the image of the frame, and the ground path are all kept synchronized by being reset to the same position and orientation with each new frame. There is no accumulated drift to invalidate the operator's commands. Thus both direction and distance sensors may be simple, relatively low-accuracy types, as they are constantly "recalibrated".

Because the operator O is using the cursor control to pick the vehicle's future path, and not its present actions, there is no feedback lag to throw the operator's reactions off.

Ordinarily, the TV camera 30 will be a visible light camera with a low-distortion lens 36. The operator's screen 14 will then present an image similar to that which he or she would see through a window on the vehicle. As discussed above, the coordinate transform of the screen path to the planned ground path maps the line 12 into waypoints 20 on the ground. The ground trapezoid is the transformed shape of the rectangular screen 14. (A low-distortion lens maps a ground trapezoid onto its rectangular film plane.)

If the camera is tilted to roughly horizontal, the horizon will be in the picture, and the trapezoid will extend to infinity. The portion of the frame above the horizon will be outside the range of the mapping transform.

Partial simulations, such as enhanced images resulting from calculations between adjacent pixels, are within the scope of the present invention. Images which are transformed to overcome lens distortion or to present a rotated, expanded, or intentionally distorted image to aid operator comprehension, are also within the scope of the present invention, as are added or enhanced portions of the screen image (for example, target sights or flashing highlights) and inset or superimposed images to denote objects identified by auxiliary systems.

Images which are generated as time projections or predictions from data received, or which are interpolations of discrete screen views separated in time, are not within the scope of the present invention.

In the present invention, the operator O is presented with a "snapshot" still frame of the ground terrain whenever the screen is refreshed. This is accomplished by video data storage in a two buffers.

The camera 30 will typically be a horizontal-sweep, top-to-bottom scan TV. The camera 30 will scan once in a short time, to "snap" a picture or frame, and send the image data to an image buffer in one of the vehicle's on-board computers for storage. The stored data represents one complete frame. This video data is sequentially retrieved from the image buffer and sent over the radio downlink to the station, where the video data is again stored in a display buffer of the station computer memory as it comes in. Once all the data for a complete frame has arrived, the stored frame is displayed on the station screen 14 continuously until the data for the next complete frame has arrived. The operator O thus sees a still picture frame taken from the position of the vehicle V at an instant in the past, which remains on the screen until the next frame is ready for display. The time between the snapshot and display is nearly equal to the time required to transmit the video data over the radio downlink, because the downlink sends only the vehicle position in addition to the video data, and the transmission time is very small. If transceiver radios 24 are used, the uplink time must be included in the complete frame cycle of radio transmission, but this also requires only a brief interval compared to the time needed to transmit the great amount of video data. This is the preferred method, because only one radio band is needed for each vehicle; the total bandwidth for a set of vehicles is halved.

(The system of the present invention is also adapted to wide-band burst transmission, in which each vehicle uses the same radio frequency in turn. In this case the image can be sent as it is scanned, and no storage buffer is needed on the vehicle. A display buffer is still needed at the station if the time between frames is greater than the persistence time of the eye, that is, about a twentieth of a second.)

In some cases the camera 30 should have the ability to tilt, pan and zoom in response to operator commands. It may also be necessary to move the camera 30 from place to place on the vehicle V, or extend it on a boom. If this capability exists, the parameters of the coordinate transforms from the line 12 to the ground waypoints 20 will change as the camera moves and changes its focal length. These changes must be reported to the station computer for generating the screen path and the waypoints. The camera position will not automatically "reset" as will the vehicle position. The camera must be kept in reference to the vehicle body for the present invention to work.

Camera motion relative to the vehicle V requires a camera mount 32, shown in FIG. 5. The mount 32 will have servomechanisms 34, may include sensors for detecting the position of the camera 30. In FIG. 5, the sensors are incorporated into the servos 34. FIG. 5 shows a mount having tilt, pan, and transverse translation mechanisms. These are illustrative only: mounts allowing any sort of motion are within the scope of the present invention. FIG. 5 also shows a zoom servomechanism and sensor 34 mounted on the lens 36.

Figure 7:
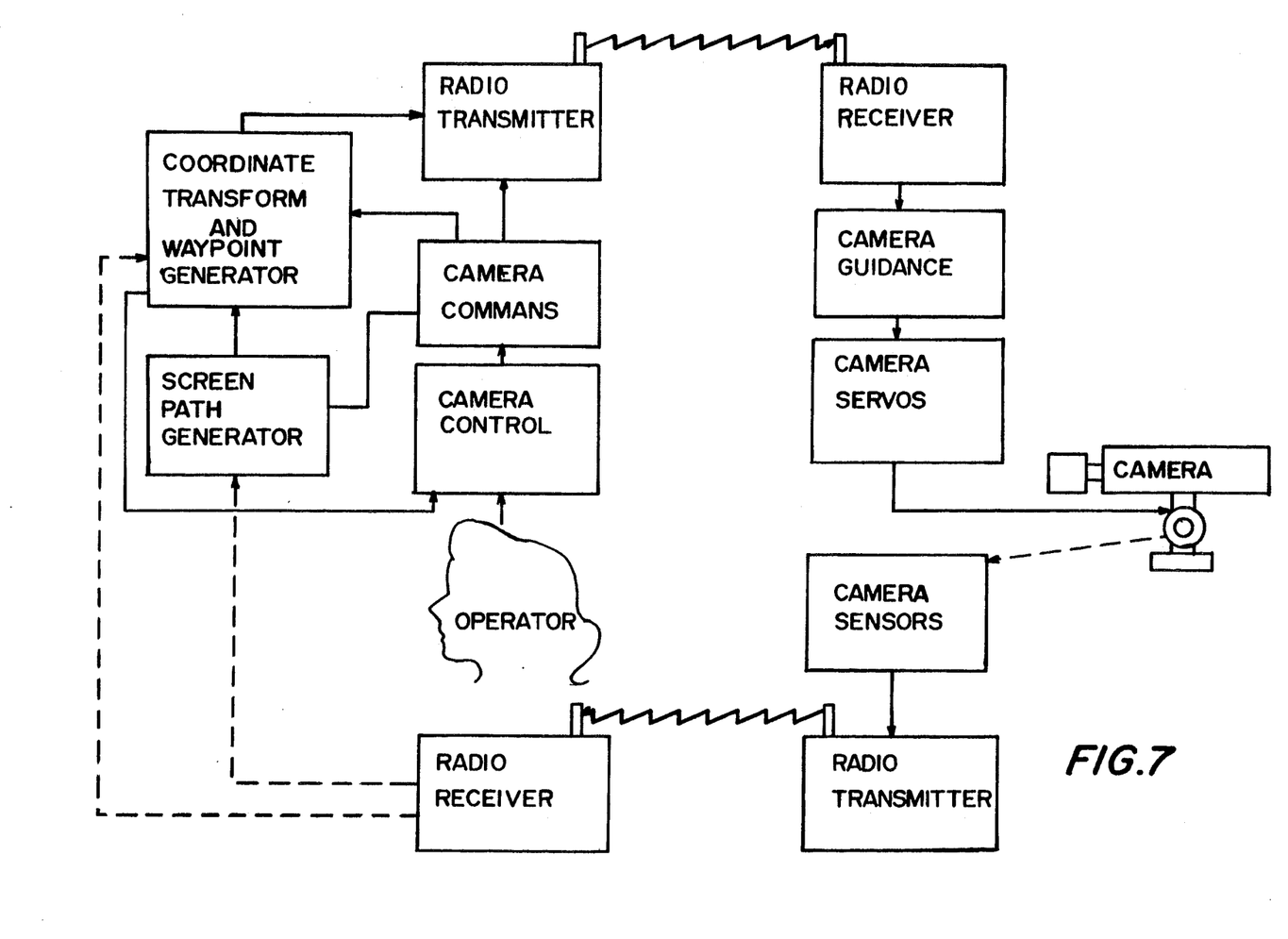
FIG. 7 is a schematic showing the flow of camera control information through the system where the camera is movable relative to the vehicle body.

A schematic of a camera control system is shown in FIG. 7. If the camera controls are positive, such as by step motors, the station computer can keep track of the camera position by integrating all the camera commands as time goes by, and calculating the transform parameters at the same time; in this case the control will follow the solid arrow lines of FIG. 7. If on the other hand the camera controls are of the type which can drift, such as belt drives, then the camera mount must include sensors and means to report the attitude and focal length of the camera and lens. The extra information flow for this case is shown by the dashed lines in FIG. 7. The station computers cannot know the the dashed lines in FIG. 7. The station computers cannot know the position of the camera by integrating past commands sent over the uplink, and so must receive reports from the camera sensors by way of the downlink.

The camera may be controlled by operator commands over the uplink. The camera may also be controlled automatically, that is, by a computer. Either the guidance system computer on board the vehicle, or a station computer, may direct the camera motions. If the guidance system controls the camera, then feedback information on camera position which is needed at the station may be sent either from camera mount sensors, or else by relaying the guidance system's camera commands, over the downlink to the station. If camera control originates at the station, then feedback on camera position from the vehicle may be needed.

The present invention is intended primarily for ground surfaces which are two dimensional, but it also adaptable to piloting vehicles which move in three-dimensional space above a surface, for example, drone airplanes and shallow-water submarines. Vehicles like these are not conceptually different from ground vehicles in which the camera is elevated to various heights on a boom or telescoping mast. Such space-traversing vehicles must include an altitude sensor, whose output is downlinked to the station computer to be used as a screen/ground transform parameter.

Two-dimensional surfaces are rarely flat. If the navigation sensors include inclinometers, and the guidance system of the vehicle has a program adapted to dealing with hills and ravines, the vehicle will guide itself more accurately. Such a program may account for foreshortening of the path as laid out on the screen, as for example, by multiplying odometer readings by the cosine of the slope to obtain the horizontal distance traveled when the waypoint generator has assumed level ground. A more sophisticated program might allow the operator O to break the path into discontinuous segments, for use when a portion of the ground is invisible on the screen, as at the crest of a hill.

As can be seen in FIG. 6, the present invention incorporates three basic feedback loops whose names are centered inside the respective loops: the operator loop wherein the operator O determines the path; the vehicle loop wherein the vehicle V is guided according to waypoints and commands transmitted over the uplink; and the system loop which is incorporates the radio links. The vehicle loop is not an essential element of the present invention, as the navigation system is optional. The other two loops are essential.

The discussion above outlines the preferred embodiment of the present invention, which allows the maximum vehicle speed possible given still picture frames. Video data storage in a storage buffer in the on-board computer is necessary in this embodiment. There is another embodiment which is within the scope of the invention, when used with continuous transmission on a narrow radio link (as opposed to burst transmission).

In this second embodiment the camera scans continuously and the data is sent continuously to the operator's station. The display buffer and the station computer are adapted to present a screen with two frames intermixed; the border between the two views scans down and a single frame would appear only at the beginning (or end) of a sweep. Real-time images are just above the horizontal border line; time delay increases with distance upward from the border to the top of the screen, and then increases yet more as the view "wraps around" to the bottom: the image just below the border is that part farthest in the past.

This method of image transmission is the closest to realtime that is possible with a slow radio link (one part of the image is always in real time.) However, distortion will be introduced into the views by this method, since the vehicle is moving while the TV camera scans. As a result, circular objects would appear egg-shaped. However, since scanned frames present the most up-to-date information possible, some distortion might be tolerable; or, the display screen or the station computer could compensate for the distortion.

This second embodiment also requires adjustment of the vehicle computer guidance system's reporting of the vehicle position. Some particular time must be designated for position references. Also, the programs used to calculate the screen path/ground path transforms would need to be modified.

In the present invention, the various components discussed above may be replaced by functional equivalents which are within the scope of the present invention according to the definitions above. It is to be understood that the present invention is not limited to the sole embodiment described above, but encompasses any and all embodiments within the scope of the following claims.

I claim:

1. A control system for an operator to control a vehicle from a remote station, said system comprising:
   a camera on said vehicle for gathering image data;
   means for sending said image data from said camera to said station, said means for sending said image data including a radio downlink from said vehicle to said station;
   a screen at said station for displaying images from said camera, for viewing by the operator;
   means for generating a cursor and a screen path on said screen, for viewing by the operator;
   a cursor control for the operator to move said cursor on said screen to determine placement of said screen path on said screen;
   transform and waypoint generation means for geometrically transforming said screen path into a planned ground path, for determining waypoints along said planned ground path, and for assigning waypoints coordinates to said waypoints;
   a radio uplink from said station to said vehicle for sending said waypoint coordinates to said vehicle;
   a vehicle guidance system to guide said vehicle over an executed ground path, said executed ground path including said waypoints, said vehicle guidance system adapted to accept said waypoint coordinates, said vehicle guidance system including a guidance system memory for storing said waypoint coordinates, said vehicle guidance system including vehicle servomechanisms to physically control motions of said vehicle; and
   means for reporting a frame position of said vehicle to said transform and waypoint generation means over said downlink; whereby
   said screen will display an image of said vehicle environment taken by said camera at said frame position, the operator will trace out said screen path with said cursor control, and said vehicle will following said corresponding ground path automatically.

2. The control system as in claim 1, wherein said means for reporting said frame position of said vehicle includes
   a navigation system for maintaining a current vehicle position relative to said waypoints, said navigation system including sensors for detecting position, motion or orientation of said vehicle, or conditions of said vehicle environment.

3. The vehicle as in claim 2 wherein said navigation system reports said current vehicle position to said guidance system, for vehicle feedback to said guidance system.

4. The control system as in claim 1, wherein
   said means for sending image data includes an image buffer for storing said image data of one frame from said camera while said downlink transmits said data to said station, and
   said screen includes a display buffer for maintaining said one frame stationary on said screen, whereby
   the operator will continuously view a still picture taken by said camera in the past.

5. The control system as in claim 1, wherein
   said control system includes command generation means for the operator to generate commands, and wherein
   said uplink transmits said commands to said guidance system for controlling said vehicle.

6. The control system as in claim 5, including a mount connecting said camera to said vehicle, said mount including camera motion means for moving said camera relative to said vehicle, said camera motion means including mount servomechanisms;
   wherein said commands include camera motion commands;
   wherein said uplink transmits said camera motion commands to said camera motion means; and
   wherein said transform and waypoint generation means obtains information on camera position from said downlink for transforming said screen path into a planned ground path according to said camera position; whereby
   said camera will pan, tilt, or translate at said commands from the operator and said control system will function properly.

7. The control system as in claim 6, including means for automatically controlling said camera position whereby
   said means for automatically controlling contains means for comparing said waypoints transmitted by said transform and waypoint generation means with said frame position of said vehicle.

8. The control system as in claim 6, wherein said camera includes a variable-focal-length zoom lens and zoom control servomechanism, said camera motion commands include zoom commands, and wherein said transform and waypoint generation means obtains information on camera lens focal length from said zoom control servomechanisms for transforming said screen path into a planned ground path according to said focal length; whereby said camera lens will zoom at the command of the operator and said control system will function properly.

9. The control system as in claim 8, including means for automatically controlling said camera position whereby said means for automatically controlling contains means for comparing said waypoints transmitted by said transform and waypoint generation means with said frame position of said vehicle.

10. The control system as in claim 1, wherein said transform and waypoint generation means includes means for automatically determining said waypoints.

* * * * *